United States Patent [19]
Schwab et al.

[11] Patent Number: 5,494,867
[45] Date of Patent: Feb. 27, 1996

[54] METHOD FOR MAKING FIBER-REINFORCED SILICON NITRIDE COMPOSITES

[75] Inventors: Stuart T. Schwab; Renee C. Graef; David L. Davidson, all of San Antonio, Tex.

[73] Assignee: Southwest Research Institute, San Antonio, Tex.

[21] Appl. No.: 212,019

[22] Filed: Mar. 11, 1994

Related U.S. Application Data

[63] Continuation-in-part of Ser. No. 764,793, Sep. 24, 1991, Pat. No. 5,294,425.

[51] Int. Cl.[6] .................................................. C04B 35/589
[52] U.S. Cl. ........................... 501/95; 501/97; 427/226; 264/60
[58] Field of Search ...................... 501/95, 97; 427/226; 264/60

[56] References Cited

U.S. PATENT DOCUMENTS

| | | |
|---|---|---|
| 4,158,687 | 6/1979 | Yajima et al. . |
| 4,285,895 | 8/1981 | Mangels et al. . |
| 4,324,843 | 4/1982 | Brennan et al. . |
| 4,460,638 | 7/1984 | Haluska . |
| 4,618,529 | 10/1986 | Yamamura et al. . |
| 4,689,188 | 8/1987 | Bhatt . |
| 4,781,993 | 11/1988 | Bhatt . |
| 4,935,481 | 6/1990 | Vaahs et al. ................................ 528/28 |
| 5,024,979 | 6/1991 | Debaig-Valade et al. ............. 501/97 X |
| 5,055,431 | 10/1991 | Blum et al. ............................ 501/95 X |
| 5,120,686 | 6/1992 | Gallo ........................................ 501/97 |
| 5,133,993 | 7/1992 | Streckert et al. ...................... 427/226 |
| 5,145,812 | 9/1992 | Arai et al. ................................. 501/97 |
| 5,176,941 | 1/1993 | Peuckert et al. ...................... 427/226 |
| 5,198,152 | 3/1993 | Liimatta et al. ..................... 501/95 X |
| 5,225,243 | 7/1993 | Brück et al. ............................ 427/226 |
| 5,294,425 | 3/1994 | Schwab ................................. 501/97 X |

FOREIGN PATENT DOCUMENTS 52-81309  7/1977  Japan .

*Primary Examiner*—Karl Group
*Attorney, Agent, or Firm*—John L. Sigalos

[57] ABSTRACT

A method of making fiber-reinforced preceramic and ceramic composites by infiltrating a preform of heat-resistant fibers with a solvent-free thermosetting preceramic polysilazane poller. The invention also comprises the resultant preceramic and ceramic composites.

6 Claims, 2 Drawing Sheets

METHOD FOR MAKING FIBER-REINFORCED SILICON NITRIDE COMPOSITES

CROSS-REFERENCE TO RELATED APPLICATION

The instant application is a continuation-in-part of U.S. patent application Ser. No. 07/764,793, filed Sep. 24, 1991, now U.S. Pat. No. 5,294,425, whose entire disclosure is incorporated herein by reference.

BACKGROUND OF THE INVENTION

The present invention relates to, the process of making silicon-nitride ($Si_3N_4$) composites and the resultant products utilizing the polymeric ceramic precursors disclosed in the parent application set forth above, whose entire specification and claims are specifically incorporated herein by reference.

Polymer-matrix composites, of which Fiberglas is probably the most familiar, enjoy widespread use in the aerospace industry, and growing use in the automotive industry. While their convenience of fabrication often outweighs their disadvantages, the limitations of polymer-matrix composites have fostered the development of metal-matrix and, more recently, ceramic-matrix composites. Excellent high-temperature strength retention and resistance to oxidation give ceramics the potential to replace metals in many structural applications, including airframes and engines. The high strength to density ratio of ceramic components helps to decrease a system's total weight, and thus to increase its operating efficiency.

However, while ceramics have enormous potential, their adoption has been seriously hampered by their brittle fracture behavior, high flaw sensitivity, and resulting low tensile strength. Incorporation of continuous fibers into a ceramic matrix may yield a composite material with superior properties by providing a toughening mechanism that lessens the propensity for catastrophic failure.

There are a number of techniques which have been used to prepare ceramic composites, all of which have inherent difficulties. One technique is the use of ceramic powder processing techniques. This involves the consolidation of micron-sized particles through sintering and treatment at a high temperature (usually above 1300° C.). Unlike metals which are somewhat compliant, ceramic particles are very hard and abrasive and the fibers that are utilized to reinforce such composites are often broken when such methods are employed. The fiber breakage is very detrimental to the composites integrity so that the resultant composite often exhibits mechanical properties inferior to that of the unreinforced composite.

Moreover, in utilizing ceramic powders a green body is first formed, as by slip molding, injection molding, extrusion, or cold or hot pressing, followed by sintering of the green body. Sintering most often results in products that contain voids or other defects and lacking the accurate dimensions required, thus necessitating subsequent expensive machining.

Another technique is the "sol-gel" technique of ceramic fabrication in which inorganic polymers are decomposed into ceramics when heated. While sol-gel processing has been used to fabricate fiber-reinforced composites, the ceramic yields are very low and so a large number (220) infiltration cycles are required to obtain a part with an acceptable level of porosity. In addition, current sol-gel practice is limited to oxide ceramics.

A further technique is that of reaction bonding. This technique generally has been applied to non-oxide ceramics such as silicon carbide, silicon nitride, boron nitride, and the like, but has the disadvantages of long reaction time at elevated temperature, limited net shape capability, and the potential for fiber degradation among others.

SUMMARY OF THE INVENTION

The present invention overcomes the problems of the prior art methods discussed above and provides a simple procedure for making preceramic and ceramic composites of any type of design, particularly with a two-dimensional (cloth) or multi-dimensional reinforcement.

Briefly, the present invention comprises the method of making fiber-reinforced silicon nitride preceramic and ceramic composites comprising forming a preform of heat-resistant fibers, infiltrating said preform with a solvent-free fluid preceramic polysilazane preceramic to form a preceramic composite of the shape desired, said preceramic capable of being thermally transformed into silicon nitride, and heating said preceramic composite at a temperature and for a time sufficient to transform said preceramic into a solid silicon nitride.

The invention also comprises the resultant preceramic composite and ceramic composite as described hereinafter in greater detail.

DETAILED DESCRIPTION

The instant invention requires that fluid thermosetting preceramic polymers be used as the matrix in making the preceramic composites. Preferred are the thermosetting polysilazanes, most particularly perhydropolysilazane (PHPS), which polymers can be thermally transformed into silicon nitride. Some other specific examples include N-tert-butyl hydridopolysilazane and N-n-butyl hydridopolysilazane.

As to the fibers utilized, these must be heat resistant, i.e., not be decomposed or adversely affected by the temperature of transformation of the precursor to the ceramic state and are preferably ceramic fibers such as SiC, TiSiCO, $Al_2O_3$, $Si_3N_4$, $Si_3N_4BO$, and the like. The fiber layers can be in the form of a woven roving or simply fiber in uniaxial or multiaxial orientation. They are often in the shape of the fired article desired and referred to as "preform". The composites of the instant invention can be prepared either as continuous composites in which case a continuous preform (roving or strands) can be utilized, or by batch manufacture by which case a preform of a defined shape is utilized. It is also obvious that the preform can be constituted of fibers orientated in any direction and that complex weaving patterns can be accommodated.

By utilizing fluid thermosetting preceramic polymers one is able to impregnate or infiltrate the preform with such polymer so as to imbed or infuse the polymer in the preform to completely surround the preform with the polymer. Such polymer or matrix must be solvent-free in order to avoid the problems incident to the use of solvents, such as bubbles or spaces left in the composite as the preceramic composite is being heated in order to transform the matrix into silicon nitride or silicon nitride-silicon carbide.

It will be evident that the thickness of the composite can vary widely and that there may be more than one layer of heat resistant fiber. Alternatively, the thermosetting preceramic polymer can be layered between two preforms and penetrate both, and this acts to adhere them together.

It is also possible to load the preceramic polymer with refractory powders up to 70 wt. %, if desired. Such powders include silicon carbide, silicon nitride, silicon oxide, intermetallic powders such as titanium aluminide, nickel aluminide, and the like, mixtures of such powders, and the like.

Figure 1:
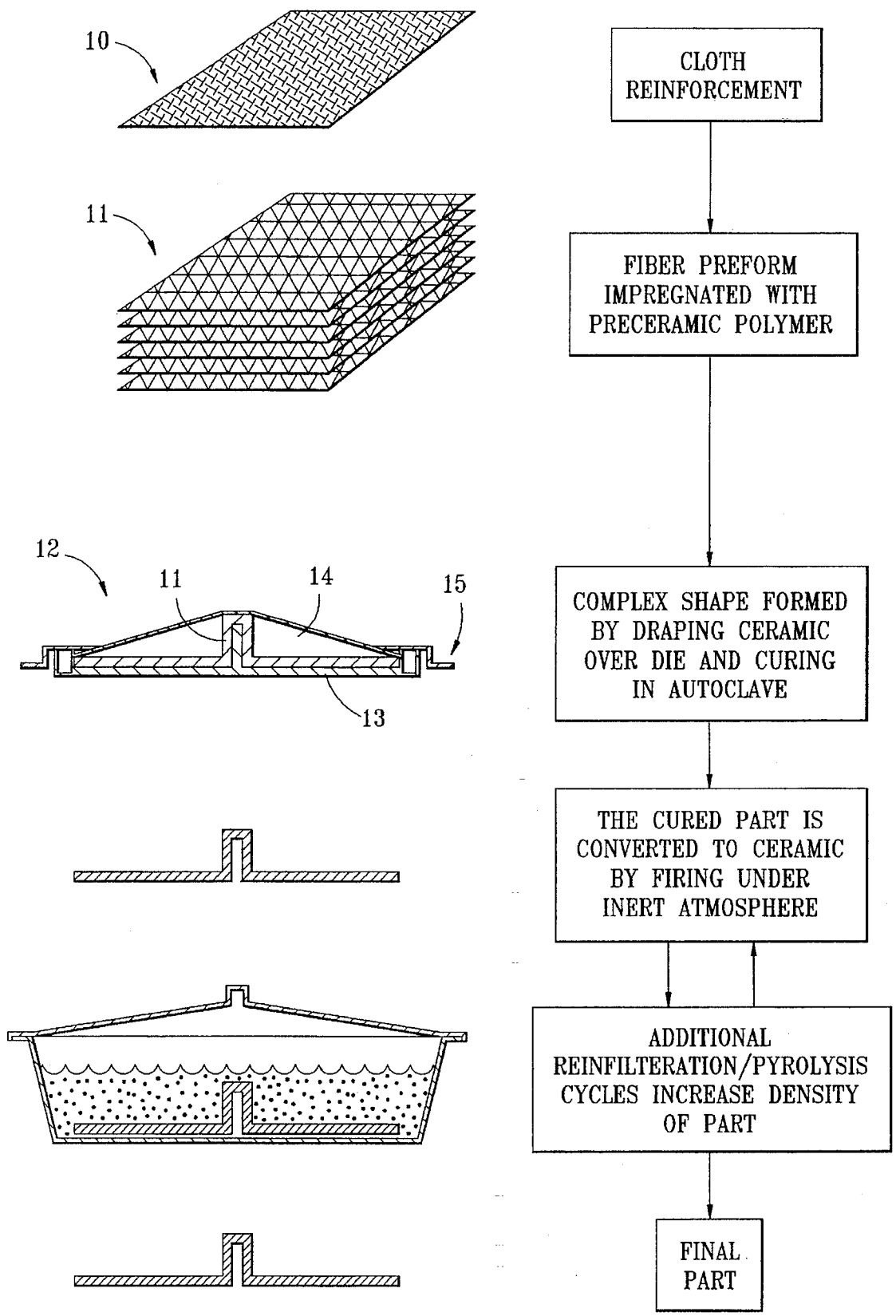
FIG. 1 is a flow diagram of the process of the present invention.

FIG. 1 is a flow diagram illustrating the present invention in which fiber cloth 10 is impregnated with a preceramic thermosetting polymer. A plurality of the impregnated cloth layers 11, the preform, to form a "green body" and placed over die 12 in an autoclave (not shown). Die 12 consists of bottom shaping tool 13 and upper mating tool 14 which complement each other to form a green body 11 into the shape desired. It is preferred to use bagging material 15 to apply pressure. Such bagging material 15 comprises an inner bleeder cloth having openings therein to permit volatiles to escape and an outer layer. The bagging material is flexible and provides for better pressure transfer than a steel dam and pressure plate when vacuum and heat are applied to mold and cure the green body to the desired shape.

While a vacuum bag is the preferred method for producing the "green" as preceramic composite, any method which confines the polymer to the reinforcing material while applying heat can be used to produce a green body. For example, vacuum hot pressing, resin transfer molding, bladder press, and all other devices commonly used to produce organic matrix composites such as Fiberglas or graphite epoxy can be used to produce the green body.

The cured part is then converted to a ceramic by firing under an inert atmosphere, such as nitrogen, and additional reinfiltration and pyrolysis cycles carried out which can vary widely in number, to increase the density of the part to the density desired.

The temperatures at which the preceramic polymer is thermally converted into the ceramic will vary widely dependent upon the particular polymer material utilized, most usually well below the 1800° C. required for sintering $Si_3N_4$. It is preferred to use the novel preceramic polymers of U.S. patent application Ser. No. 07/764,793 referred to above. These novel polysilazanes can be thermally transformed at about 800° C. into silicon nitride of high purity in high ceramic yield, at least about 80%. They also are able to densify during the thermal decomposition to form composites with relatively few, if any, voids, the vast majority of which are open and, therefore, can be filled during subsequent infiltrations. They can also be used to produce matrices varying from amorphous to fully crystalline, with fully crystalline materials obtained at 1300° C., well below the temperatures required for crystallization of other preceramic polymers.

Of the products to be formed, it is preferred to have the silicon nitride composites that are reinforced primarily with either carbon or silicon carbide fiber. These are preferred since carbon and silicon carbide fiber have excellent strength to weight ratio, superior high temperature properties, and resistance to thermal shock which makes than excellent material to be used to form a variety of high technology applications in aircraft and spacecraft as well as advanced heat engines and their frames. Such composites would also find application in highly corrosive environments, such as the chemical processing industry. If not fully densified, such composites could serve as filters for hot liquids or gases. It is evident that the fiber reinforcement provides improvements in strength and resistance to fracture ("fracture toughness") relative to the monolithic silicon nitride.

The green body can be assembled as noted by laying up sheets of the pre-impregnated materials by injecting resin into a cloth layer assembly, or by simply spreading or spraying resin between layers of the fiber cloth. The green body is then cured under vacuum at elevated temperature, and with applied external pressure by placing the part inside a vacuum bag within a process autoclave. The bag material of the vacuum bag conforms to the contours of the part, and the combination of applied external pressure and internal vacuum minimizes the amount of void space that remains after the cure cycle. As noted above, any method of confining the preceramic and infiltrated fiber preforms to the desired geometry while heating will suffice to produce a green body. The cured part is pyrolyzed at a higher temperature under ambient pressure to yield the porous ("Stage 0") composite). The pores in the composite are filled by repeatedly infiltrating the composite with additional matrix polymer precursor curing thereof under the vacuum with applied external pressure, and pyrolyzing as before. This polymer infiltration/pyrolysis process exploits polymeric precursors to silicon nitride for the production of complex continuous fiber reinforced ceramic matrix composites. The advantages of the instant processes include ease of fabrication, rapid means for producing articles of complex shape, the potential for producing materials whose porosity and mechanical properties are optimized for a specific application through modifications and polymer chemistry and process conditions, and compatibility with large scale industrial production.

Figure 2:
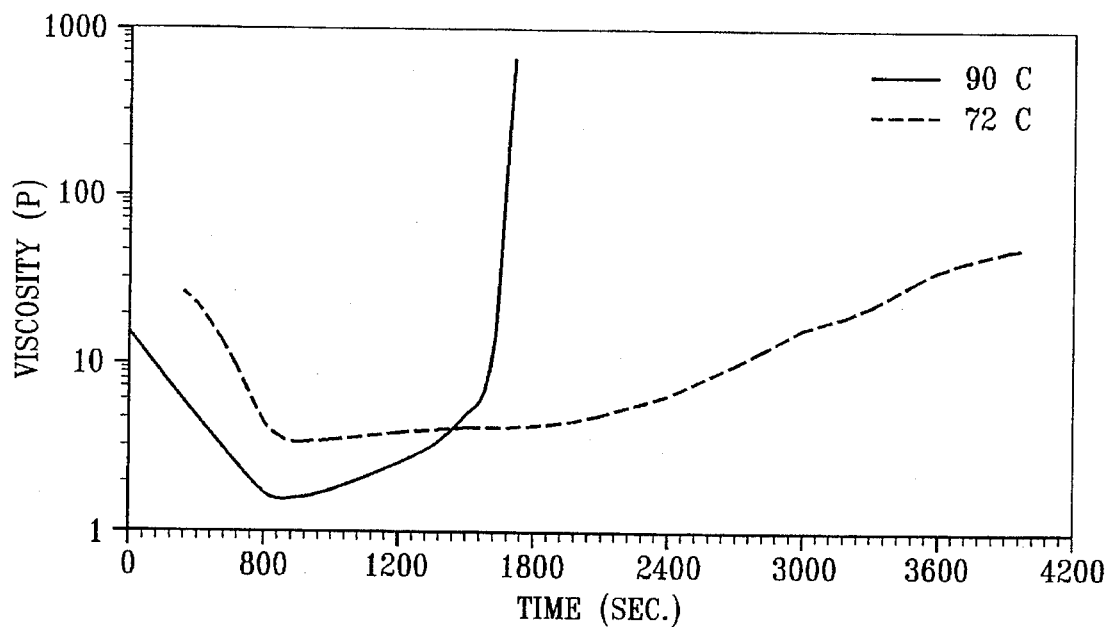
FIG. 2 is a graph showing isothermal viscosity results for a perhydropolysilazane.
Figure 3:
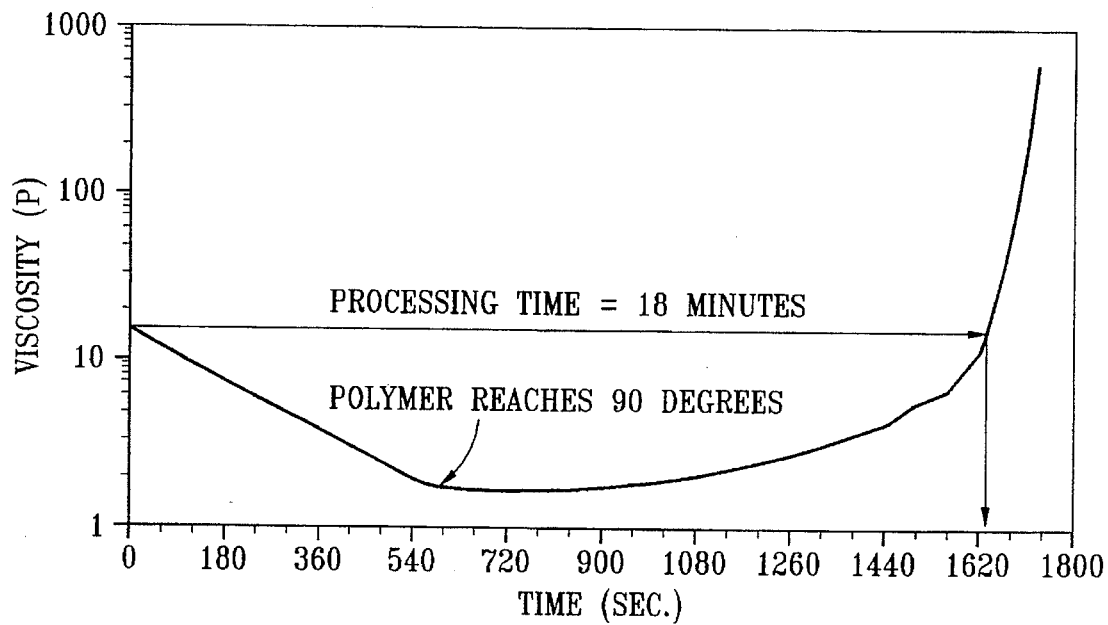
FIG. 3 is a graph showing the time necessary for the perhydropolysilazane to return to its initial viscosity.

In carrying out the process, it is important that the pressure and temperature utilized during the composite curing be carefully monitored, and this can be readily determined by routine experimentation for any particular polymer precursor utilized. Reference to FIG. 2 shows the viscosity of PHPS at 90° C. and 72° C. at various hold temperatures using a temperature ramp of 10° C./per min. to reach the temperatures. To determine the suitable "processing time" of this particular resin reference to FIG. 3 defines this processing term as the time necessary for the polymer to return to its initial viscosity after reaching the hold temperature. This is important for determining the time at which overpressure should be applied during cure of the composite for maximum density. Application of overpressure too early in the process cycle will cause the polymer to be squeezed out during processing, which produces polymer precursor poor regions and delamination. The "processing time" can thus be readily determined for any given polymer precursor by simply noting the viscosity over time at a certain temperature to reach an isothermal viscosity and then carrying out a study of when it reaches the temperature and gets back to its original viscosity as shown in FIGS. 2 and 3 above for PHPS.

Thus, the optimum pressure/temperature schedule for any given polymer precursor can be readily determined simply by balancing the viscosity of the polymer with the application of overpressure. FIGS. 2 and 3 show that with the preferred precursor polymer, PHPS, overpressure should be applied shortly after curing at the 90° C. temperature. The polymer, it will be noted, becomes less viscous before its turning to its original viscosity at about 100° C. and thereafter becoming increasingly viscous.

The nature of the ceramic matrix is determined by the firing temperature and atmosphere. Crystalline matrices are obtained at temperatures of approximately 1260° C. or greater. The upper limit of the firing temperature is determined by the capability of process equipment and by the thermomechanical stability of the reinforcement fibers. Typical Stage O composite densities range from about 1.0 g/cc to 1.5 g/cc. Additional reinfiltrations using the same cure and pyrolysis temperature as before are made until the optimum density is achieved. The density of a typical composite using PHPS after 8 reinfiltration cycles ranges from 2.0 to 2.5 g/cc.

The invention will be further described in connection with the following example which is set forth for purposes of illustration only.

EXAMPLE I

The polymeric precursor used was PHPS, and it was prepared by the process disclosed in the co-pending parent application noted above; namely, a 5:1 molar ratio of dichloro- and trichlorosilane were combined in 10e diethyl ether at 0° C. Ammonia was added to the mixture until an excess (as evidenced by reflex off −78° (condenser) was obtained. The solution was heated to drive off the excess ammonia then allowed to settle and cool to room temperature. The solid co-product ($NH_4CL$) is removed by filtration or centrifugation and the solvent and other volatiles removed under vacuum to yield PHPS a clear oily liquid. A green composite was constructed by spreading the PHPS precursor polymer between layers of 2-dimensional woven silicon carbide fiber reinforcement. The reinforcement utilized was commercially available Nicalon (SIC) 8-harness satin weave, graphite coated cloth from which the sizing had previously been removed. The infiltrated composite was heated to 90° C. for approximately 3 hours, with an overpressure of 50 psi applied 10 minutes into the cure cycle. Following the initial cure the composite was heated to 175° C. for approximately 2½ hours. The cured composite was fired under flowing nitrogen to a temperature of approximately 1000° C. Stage O composite density was calculated to be 1.1 g/cc. Additional reinfiltrations, eight in number, using the same cure and pyrolysis as before were carried out, and the resultant density was 2.4 g/cc.

The physical and mechanical properties of this composite were determined, and the results are summarized in Table I below. The testing noted was carried out using the standard test methods.

TABLE I

| Physical Properties | |
| --- | --- |
| Composite Density | 2.4 g/cc |
| Apparent Porosity (ASTM C-373) | 5.6% |
| Fiber Volume (SEM Cross-sectional map) | 60% |
| Mechanical Properties | |
| Flexural (4-Point; 2 specimens) | |
| MOR (MPa) | 207.3 ± 3.8 |
| Flexural Modulus (GPa) | 65.0 ± 4.3 |
| Compressive (3 specimens) | |
| Compressive Strength (MPa) | 495.7 ± 48 |
| Elastic Modulus (GPa) | 86.3 ± 2.3 |
| Chevron Notch Flexural (3-Point; 3 specimens) | |
| $K_{IC}$ (chn), MPa · $m^{1/2}$) | 15.6 ± 0.7 |
| Work of Fracture (KJ/$m^2$) | 11.8 ± 0.9 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of making a fiber-reinforced preceramic composite, comprising forming a preform of heat-resistant fibers, and infiltrating said preform with a liquid solvent-free perhydropolysilazane to form a preceramic composite of a shape, said perhydropolysilazane capable of being thermally transformed into silicon nitride to form a fiber-reinforced silicon nitride.

2. The method of claim 1, wherein said fibers are ceramic fibers.

3. The method of claim 2, wherein said perhydropolysilazane contains up to 70 wt. % of a refractory powder.

4. A method of making a fiber-reinforced silicon nitride ceramic composite, comprising forming a preform of heat-resistant fibers, infiltrating said preform with a liquid solvent-free thermosetting preceramic perhydropolysilazane to form a preceramic composite of a shape, said polymer capable of being thermally transformed into silicon nitride, and heating said preceramic composite in an inert atmosphere at a temperature and for a time sufficient to transform said perhydropolysilazane into a solid silicon nitride ceramic.

5. The method of claim 4, wherein said fibers are ceramic fibers.

6. The method of claim 5, wherein said perhydropolysilazane contains up to 70 wt. % of a refractory powder.

* * * * *